United States Patent
Handley

(10) Patent No.: US 9,836,979 B2
(45) Date of Patent: Dec. 5, 2017

(54) METHOD AND SYSTEM FOR LATENT DEMAND MODELING FOR A TRANSPORTATION SYSTEM

(71) Applicant: Conduent Business Services, LLC, Dallas, TX (US)

(72) Inventor: John C. Handley, Fairport, NY (US)

(73) Assignee: Conduent Business Services, LLC, Dallas, TX (US)

( * ) Notice: Subject to any disclaimer, the term of this patent is extended or adjusted under 35 U.S.C. 154(b) by 832 days.

(21) Appl. No.: 14/153,165

(22) Filed: Jan. 13, 2014

(65) Prior Publication Data
US 2015/0199697 A1      Jul. 16, 2015

(51) Int. Cl.
| | |
|---|---|
| *G08G 1/00* | (2006.01) |
| *G06Q 30/02* | (2012.01) |
| *G06Q 10/06* | (2012.01) |
| *G01C 23/00* | (2006.01) |
| *G01C 21/00* | (2006.01) |
| *G08G 1/133* | (2006.01) |

(Continued)

(52) U.S. Cl.
CPC ........... *G08G 1/202* (2013.01); *G01C 21/005* (2013.01); *G01C 21/20* (2013.01); *G01C 23/00* (2013.01); *G06Q 10/067* (2013.01); *G06Q 30/0202* (2013.01); *G06Q 30/0205* (2013.01); *G06Q 50/30* (2013.01); *G08G 1/123* (2013.01); *G08G 1/133* (2013.01); *G08G 1/205* (2013.01)

(58) Field of Classification Search
None
See application file for complete search history.

(56) References Cited

U.S. PATENT DOCUMENTS

| | | | |
|---|---|---|---|
| 5,122,959 | A | 6/1992 | Nathanson et al. |
| 6,006,159 | A | 12/1999 | Schmier et al. |

(Continued)

OTHER PUBLICATIONS

Atkins et al., "Re-thinking how family researchers model infrequent outcomes: A tutorial on count regression and zero-inflated models", to be published as (copyright American Psychological Association), Journal of Family Psychology, (2007) 33 pages.

(Continued)

*Primary Examiner* — Gurkanwaljit Singh
(74) *Attorney, Agent, or Firm* — Fox Rothschild LLP

(57) ABSTRACT

A method and system for identifying demand in a transportation system. A boarding count model is determined based upon passenger arrival information, and a geographic and time-specific generalized boarding model is determined based upon the boarding count model as well as information related to a plurality of stops on a route in the transportation system. For each of the plurality of stops, an approximated uniform arrival model is determined based upon the generalized arrival model and a time period between arriving vehicles at a specific stop, an instantaneous demand model is determined based upon the uniform arrival model, and a probability of no demand model is determined based upon the uniform arrival model. A report including the instantaneous demand and the probability of no demand determined can be generated. Based upon the report, various operational parameters for the transportation system can be manually or automatically adjusted.

12 Claims, 5 Drawing Sheets

(51) Int. Cl.
  *G01C 21/20* (2006.01)
  *G08G 1/123* (2006.01)
  *G06Q 50/30* (2012.01)

(56) References Cited

U.S. PATENT DOCUMENTS

| | | |
|---|---|---|
| 6,317,686 B1 | 11/2001 | Ran |
| 7,546,206 B1* | 6/2009 | Miller .................... G01C 21/00 701/120 |
| 7,720,630 B1* | 5/2010 | Miller .................... G01C 23/00 702/150 |
| 8,275,540 B2 | 9/2012 | Downs et al. |
| 2003/0135304 A1 | 7/2003 | Sroub et al. |
| 2006/0089812 A1* | 4/2006 | Jacquez .............. G06F 19/3487 702/23 |
| 2006/0235739 A1 | 10/2006 | Levis et al. |
| 2007/0173993 A1 | 7/2007 | Nielsen et al. |
| 2010/0036728 A1* | 2/2010 | Pechenick .......... G06Q 30/0249 705/14.48 |
| 2010/0088146 A1 | 4/2010 | Zhong et al. |
| 2010/0185486 A1* | 7/2010 | Barker ............... G06Q 30/0202 705/7.31 |
| 2010/0299177 A1* | 11/2010 | Buczkowski .......... G06Q 10/06 705/7.13 |
| 2011/0161138 A1 | 6/2011 | Keaveny et al. |
| 2012/0310707 A1 | 12/2012 | Naphade et al. |
| 2013/0024249 A1 | 1/2013 | Zohar et al. |
| 2013/0046586 A1 | 2/2013 | Lerner et al. |
| 2013/0164715 A1 | 6/2013 | Hunt et al. |
| 2013/0317884 A1* | 11/2013 | Chidlovskii ......... G06Q 10/063 705/7.31 |
| 2013/0339341 A1 | 12/2013 | Fan et al. |
| 2013/0344802 A1 | 12/2013 | Armour et al. |
| 2014/0019177 A1 | 1/2014 | Smith |
| 2014/0039986 A1 | 2/2014 | Handley |
| 2014/0200805 A1 | 7/2014 | Modica et al. |
| 2014/0278086 A1 | 9/2014 | San Filippo et al. |

OTHER PUBLICATIONS

Berkow et al., (2009) "Beyond Generating Transit Performance Measures: Visualizations and Statistical Analysis Using Historical Data", Transportation Research Record (2111), 158-168.

Mandelzys et al., "Automatically Identifying the Causes of Bus Transit Schedule Adherence Performance Issues Using AVL/APC Archived Data", Nov. 3, 2009, Transportation Research Record: Journal of the Transportation Research Board, vol. No. 2143, published by National Academies, Washington, D.C. pp. 9-15.

Strathman et al., "Empirical Analysis of Bus Transit On-Time Performance", May 1992, Transportation Research A, V. 27A, pp. 93-100.

Berkow et al., "Beyond Generating Transit Performance Measures: Visualizations and Statistical Analysis Using Historical Data", Transportation Research Record (2111), 158-168.

Mandelzys et al., "Automatically Identifying the Causes of Bus Transit Schedule Adherence Performance Issues Using AVL/APC Archived Data", Transportation Research Record: Journal of the Transportation Research Board, vol. No. 2143, published by National Academies, Washington, D.C. pp. 9-15.

Strathman et al., "Empirical Analysis of Bus Transit On-Time Performance", Transportation Research A, V. 27A, pp. 93-100.

Washington et al., "Count Data Models", Statistical and Econometric Methods for Transportation Data Analysis, second Edition, Chapter 11, pp. 283-301, published by CRC Press, 2011 by Taylor & Francis Group, LLC.

Atkins et al., "Re-thinking how family researchers model infrequent outcomes: A tutorial on count regression and zero-inflated models", to be published as (copyright American Psychological Association), Journal of Family Psychology, 33 pages.

Wickelmaier F., "An Introduction to MDS" Aalborg University, Denmark, May 4, 2003.

* cited by examiner

METHOD AND SYSTEM FOR LATENT DEMAND MODELING FOR A TRANSPORTATION SYSTEM

BACKGROUND

The present disclosure relates to modeling demand in a transportation system, such as a public bus, train or plane system. More specifically, the present disclosure relates to latent demand modeling as a function of the time of the day and the day of the week for a transportation system.

Many service providers monitor and analyze analytics related to the services they provide. One important analytic related to efficient operation is travel demand for a transportation system or a particular route in a transportation system. For example, public transportation vehicles may be equipped with an automated passenger counter configured to measure passengers boarding or alighting a vehicle at a particular stop. However, data from automated passenger counters is not collected regularly, and thus the information is difficult to accurately correlate to time and place. Additionally, if no one is at a stop, the vehicle typically will not stop unless there is a passenger wanting to get off the vehicle. Thus, such stops may be ignored completely and there is no registration of the stop with the automated passenger counter.

Additionally, public transportation vehicle routes are run irregularly throughout the day, and some routes are not run at all at certain hours such as late at night or early in the morning, e.g. from 2:00 AM to 5:00 AM. Thus, the actual number of passengers picked up at a stop, i.e., the demand at that stop, is not only dependent upon the time of the day but also the interval between vehicles servicing that stop. A longer interval will result in a higher number of passengers. However, this increase in passengers may not be related to the population or overall demand of the stop. Rather, the increase may be a result of a longer time interval between vehicles servicing that particular stop. As such, using existing technology and techniques to estimate demand results provides an incomplete analysis when modeling demand as a function of time of day and day of week.

SUMMARY

In one general respect, the embodiments disclose a method of identifying demand in a transportation system. The method includes determining a boarding count model based upon passenger arrival information and determining a geographic and time-specific generalized boarding model based upon the boarding count model as well as information related to a plurality of stops on a route in the transportation system. For each of the plurality of stops, the method includes determining an approximated uniform arrival model based upon the generalized arrival model and a time period between arriving vehicles at a specific stop, determining an instantaneous demand model based upon the uniform arrival model, and determining a probability of no demand model based upon the uniform arrival model. The method also includes generating a report including at least an indication of instantaneous demand determined based upon the instantaneous demand model and an indication of probability of no demand determined based upon the no demand model, and presenting the report.

In another general respect, the embodiments disclose a system for identifying demand in a transportation system. The system includes a processing device, a display device operably connected to the processing device, and a computer readable medium in communication with the processing device. The computer readable medium includes one or more programming instructions for causing the processing device to determine a boarding count model based upon passenger arrival information and determine a geographic and time-specific generalized boarding model based upon the boarding count model as well as information related to a plurality of stops on a route in the transportation system. For each of the plurality of stops, the one or more instructions cause the processing device to determine an approximated uniform arrival model based upon the generalized arrival model and a time period between arriving vehicles at a specific stop, determine an instantaneous demand model based upon the uniform arrival model, and determine a probability of no demand model based upon the uniform arrival model. The one or more instructions further cause the processing device to generate a report that includes an indication of instantaneous demand determined based upon the instantaneous demand model and an indication of probability of no demand determined based upon the no demand model, and display the report on the display device.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "computing device" or "processing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device or processing device may interpret and execute instructions. Unless specifically limited, reference to any device can refer to a single device and/or a group of devices which work together to implement a process.

A "mathematical model," or simply "model," refers to a process of developing a mathematical representation of one more variables and one or more relationships that exists between those variables. A variable, as used herein, refers to abstractions of quantifiable parameters of interest that are either known or are being solved for in the model. A relationship, as used herein, refers to algebraic operators, functions and algorithms and other similar mathematical operators.

The present disclosure is directed to a method and system for modeling demand for a transportation system using Bayesian latent modeling techniques. Based upon information collected and modeling for a particular route or stop in the transportation system, instantaneous demand for that stop or route can be modeled for a particular time of day and day of week, as well as the probability of no demand occurring at any particular time of day and day of week. Using the techniques as described herein, a public transportation company can monitor demand at each stop along its provided routes to determine if, for example, stops should be eliminated, additional stops should be added, vehicle sizes can be adjusted, and other similar actions that can impact system efficiency and reduce and/or maximize operating expenses.

Figure 1:
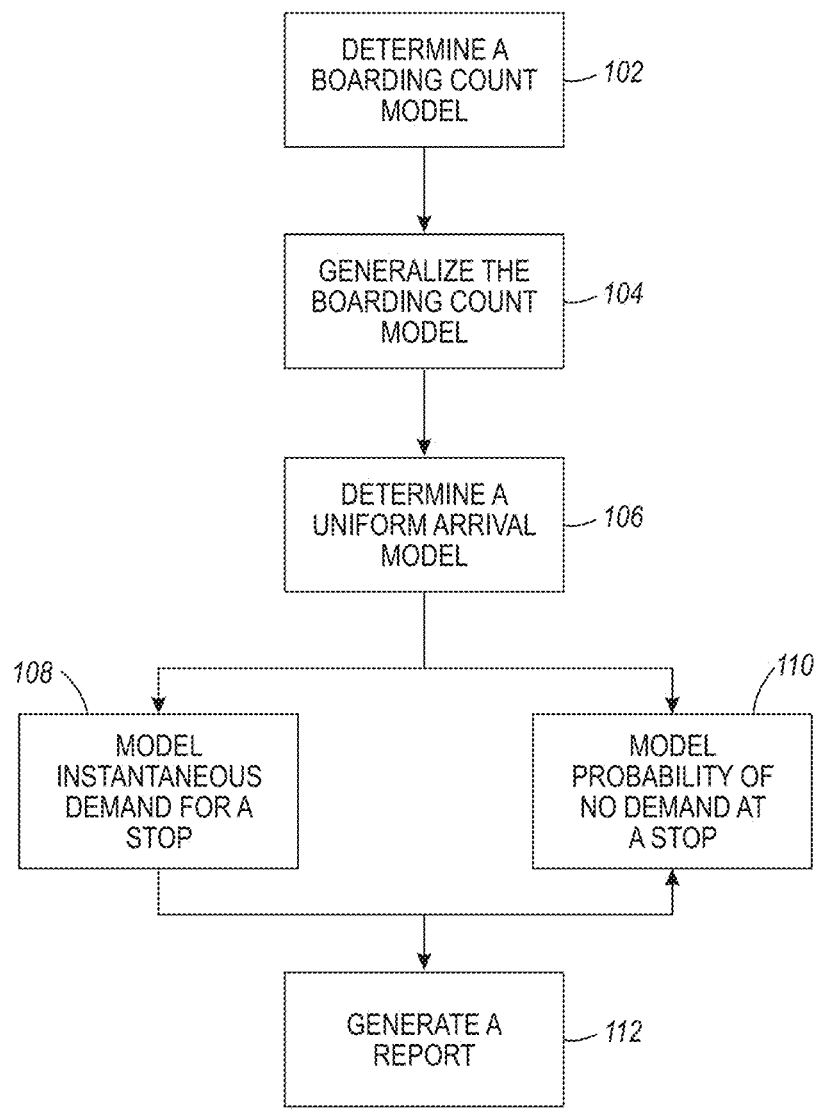
FIG. 1 depicts a sample flow chart for modeling demand for a transportation system according to an embodiment.

FIG. 1 illustrates a flow chart showing a sample process for modeling demand for a particular transportation system. For discussion purposes only, a public transportation system including multiple buses operating on varying routes, each route include multiple stops will be described. However, it should be noted that such a transportation system is described by way of example only. The processes, systems and methods as taught herein may be applied to any environment where performance based metrics and information are collected for later analysis, and provided services may be altered accordingly based upon the collected information to improve demand-based efficiency.

As shown in FIG. 1, a computing device may determine 102 a current boarding count model for a particular stop in the public transportation system. Passenger information can be obtained from an automatic passenger counter device associated with each vehicle in the transportation system. Inspection of typical passenger data for a public transportation system may show fairly sparse demand at certain times of the day. For example, near a city, public transportation demand is greatest at rush hours (e.g., 7:00-10:00 AM and 4:00-7:00 PM). At times outside of the rush hour ranges, demand can be reduced to near zero. As such, determining 102 a current boarding count model for a particular stop may be done using a zero inflated Poisson distribution, i.e., a distribution that provides for frequent zero-valued observations. In this case, the processing device may determine 102 the current boarding model using the following equation:

$$f(x; p, \lambda) = pI(x=0) + (1-p)\text{Pois}(x,\lambda) \quad (1)$$

where x is the number of passengers boarding the vehicle at a given time interval. Demand is thus determined as a rate of passengers boarding as a function of time. For example, the demand can be modeled as a Poisson arrival process that is conditioned on a latent variable of non-zero demand.

However, in a typical public transportation system, different routes exhibit different demand rates as a function of geography. For example, stops located closer to higher population centers are expected to exhibit a higher demand than stops located in rural or sparsely populated areas. To account for such variation, the processing device may generalize 104 the current boarding count model for a particular route using the following equation:

$$f(x; p, \lambda_i) = pI(x=0) + (1-p)\text{Pois}(x,\lambda_i), i=1, \ldots, n \quad (2)$$

where n is the number of stops along a particular route. Thus, the processing device can generalize 104 the boarding count model to produce a generalized boarding model accounting for each stop along a route or, more generally, each stop serviced by the transportation system, thus accounting for the geographic impact on demand throughout the transportation system.

Additionally, beyond merely accounting for geographic impact on demand, the time of the day, as well as the time between scheduled stops, can impact demand. In particular, the longer the time interval between a vehicle arriving at a particular stop, the larger the resulting demand will be at the stop. In practice, arrival rates increase closer to the scheduled vehicle arrival time. However, for modeling, uniform arrival over the time interval can serve as an accurate approximation. Thus, the computing device may determine 106 an approximated uniform arrival model based upon the generalized boarding model using the following equation:

$$f(x; p_{(t_j-t_{j-1})}, \lambda_i(t_j-t_{j-1})) = p_{(t_j-t_{j-1})}I(x=0) + (1-p_{(t_j-t_{j-1})})\text{Pois} \\ (x,\lambda_i(t_j-t_{j-1})), i=1,\ldots,n; j=1,\ldots,T \quad (3)$$

where T represents the total time interval between scheduled arrivals at each particular stop.

Thus, the current equations model a Poisson distribution of demand that varies by time and the geography of a stop. Additionally, the equations include an assumption that a latent probability of no demand varies over time to absorb the zero values of no one being at the bus stop at a given time. Zero values may be both a result of the automatic passenger counter registering a zero count at a stop (i.e., the vehicle only stopped to allow passengers to depart) as well as a non-count for a stop (i.e., the vehicle did not stop as there were no passengers wishing to board or depart). In this sense, the lack of demand can be accurately modeled to expose true demand where people may or may not use the transportation system (e.g., catch a bus) at that place and time (e.g., a particular time during a specific day).

To gain further insight from the data, additional explanatory variables may be introduced in the form of random effect terms for both the hour of the day and day of the week. Such an introduction can allow for insight into how instantaneous demand $\lambda_j$ and the probability of no demand $p_{(t_j-t_{j-1})}$ vary by the hour of the day and the day of the week. This provides for a modeling process where a significant amount of variation is explained and accounted for.

The statistical model of the demand information may be fitted using Bayesian methods and may incorporate an observation process, i.e., the model compensates for the possibility that passenger arrival information from the automatic passenger counter may include errors. An example of the model may be:

$$N_j \sim \text{Poisson}((1-u_j)\lambda_j(t_j-t_{j-1}))$$

$$u_j \sim \text{Bernoulli}(p_j)$$

$$\lambda_j = \exp(a[h(t_j)] + b[w(t_j)])$$

$$p_j = 1/(1+\exp(-c[h(t_j)] - d[w(t_j)]))$$

$$Y_j \sim \text{Normal}((1-u_j)N_j, \tau) \quad (4)$$

In the above model, $Y_j$ is the count of passengers at bus stop i between times $t_{j-1}$ and $t_j$; $p_j$ is the probability of no one even wanting to ride the vehicle between times $t_{j-1}$ and $t_j$; h is a function that returns the hour of a time in integers from 1 to 20 (e.g., assuming that there are 4 morning hours in which the transportation system does not operate); w is a function that returns the weekday of a time in integers from 1 to 7; a and b are 20×7 matrices that captures the interactions of hour and weekday, which are estimated from the data (again, limited to 20 in this example as it is assumed the transportation system operates 20 hours a day); c and d are similar 20×7 matrices that captures the interactions of hour and weekday, which are estimated from the data; τ is the precision of the counting system by measuring the random variation not explained by the time varying model.

Additionally, as modeled, $N_j$ represents a listing of the number of passengers without accounting for error and $u_j$ represents whether a person is actually waiting at a stop or not at a given time. Thus, as modeled, the passenger count $Y_j$ for each stop accounts for any error generated by the automatic passenger counters by including both $u_j$ and τ.

Additionally, based upon the data provided for and the models included above in equation set (4), a computing device can model 108 the instantaneous demand for a stop $\lambda_i$ as well as model 110 the probability $p_j$ that there is no demand at the stop, i.e., no passengers are waiting to board at that stop at a specific time. More specifically, the computing device can model 108 the instantaneous demand $\lambda_i$ as a function of the expected rate of passenger arrival over time for each hour of the day and each day of the week. Similarly, the computing device can model 110 the probability $p_j$ of no demand as an inverse function of the expected rate of passenger arrival for each hour of the day and each day of the week.

In an example, the statistical models may be fit using a Bayesian fitting method such as a Markov Chain Monte Carlo method. Markov Chain Monte Carlo methods represent a class of algorithms for sampling from probability distributions based upon constructing a Markov Chain, i.e., a data structure where a current state is dependent only upon itself, not any previous states of the data. Such a data structure is applicable to modeling demand as the demand for a particular time period may be based solely upon the time of day and the day of the week for that period, and be may be completely independent of any surrounding periods. More specifically, the demand at a stop in a transportation system between 9:00 and 10:00 can be completely independent of the demand at that stop between 8:00 and 9:00 as well as between 10:00 and 11:00.

The computing device may generate 112 a report including the specific demand information. The report may include, for example, a representation or indication of the instantaneous demand model as determined from the instantaneous demand model for a particular stop, a representation or indication of the probability that there is no demand as determined based upon the probability of no demand model for the particular stop, as well as additional information such as estimated and actual passenger arrival information for the stop. The report may be distributed or otherwise presented to one or more recipients for further analysis and review. For example, a scheduling manager for a public transportation system may analyze both the instantaneous demand model for a stop as well as the probability for no demand model at that stop, and determine whether to eliminate that stop from the route at one or more times of the day or days of the week. Similarly, if the instantaneous demand model indicates high demand for a stop, the scheduling manager may increase the number of vehicles stopping at that stop or provide larger vehicles at that stop to accommodate the increased demand.

It should be noted that the computing device that performed the various model determinations may generate 112 and provide the report. However, this is shown by way of example, and additional computing devices may generate the report. For example, a manager may access a reporting application at their personal computing device. The personal computing device may access a central server, requesting the various demand models as described above. The personal computing device, via the reporting application or another similar software application, may then generate the reports for review by the manager.

In addition to generating a report, the system may be configured to perform additional automated operations related to the overall operation of the transportation system. For example, the system may analyze the overall demand data to adjust one or more particular routes by eliminating stops, creating new stops, and consolidating stops to smooth out demand over time. The system may automatically revise and update a route schedule, notifying a dispatcher for the transportation system that the route changes have been made to accommodate demand. Similarly, the demand information may be used by the system to automatically adjust fares during periods of varying demand. For example, during low demand periods the system may automatically lower fares to boost demand. Conversely, during high demand periods, the system may maintain a higher fare to maximize income. Additionally, the demand information may be used to automatically determine what type of vehicle to use during specific times of the day. For example, during low demand periods, the system may schedule a lower capacity vehicle to handle the lower demand, e.g., a 15-20 seat paratransit vehicle. Conversely, during high demand periods, the system may schedule a higher capacity vehicle such as a large, articulate bus to handle higher demand.

Additionally, the information contained within the report may be analyzed to identify and/or anticipate random high demand periods, and to respond accordingly. For example, the system may automatically deploy another vehicle to handle a random period of high demand by contacting a dispatcher or a manager in the transportation system, identifying the particular area of high demand as well as the instruction to deploy another vehicle.

It should be noted that while buses and similar transportation vehicles are described above, the system is not limited to transportation systems that include buses only. Airlines can utilize the automated demand monitoring techniques as described herein to modify plane schedules to accommodate passenger demand. Similarly, transportation systems including trains can use the automated demand monitoring techniques to accommodate for changes in demand as well, by alternating schedules or changing the types of trains used during certain periods of the day. For example, one or more passenger cars can be added to a train during high demand to accommodate additional riders and maximize potential income. Conversely, during periods of lower demand, one or more passenger cars can be removed from the trains, thereby reducing operating expenses during those times.

Figure 2:
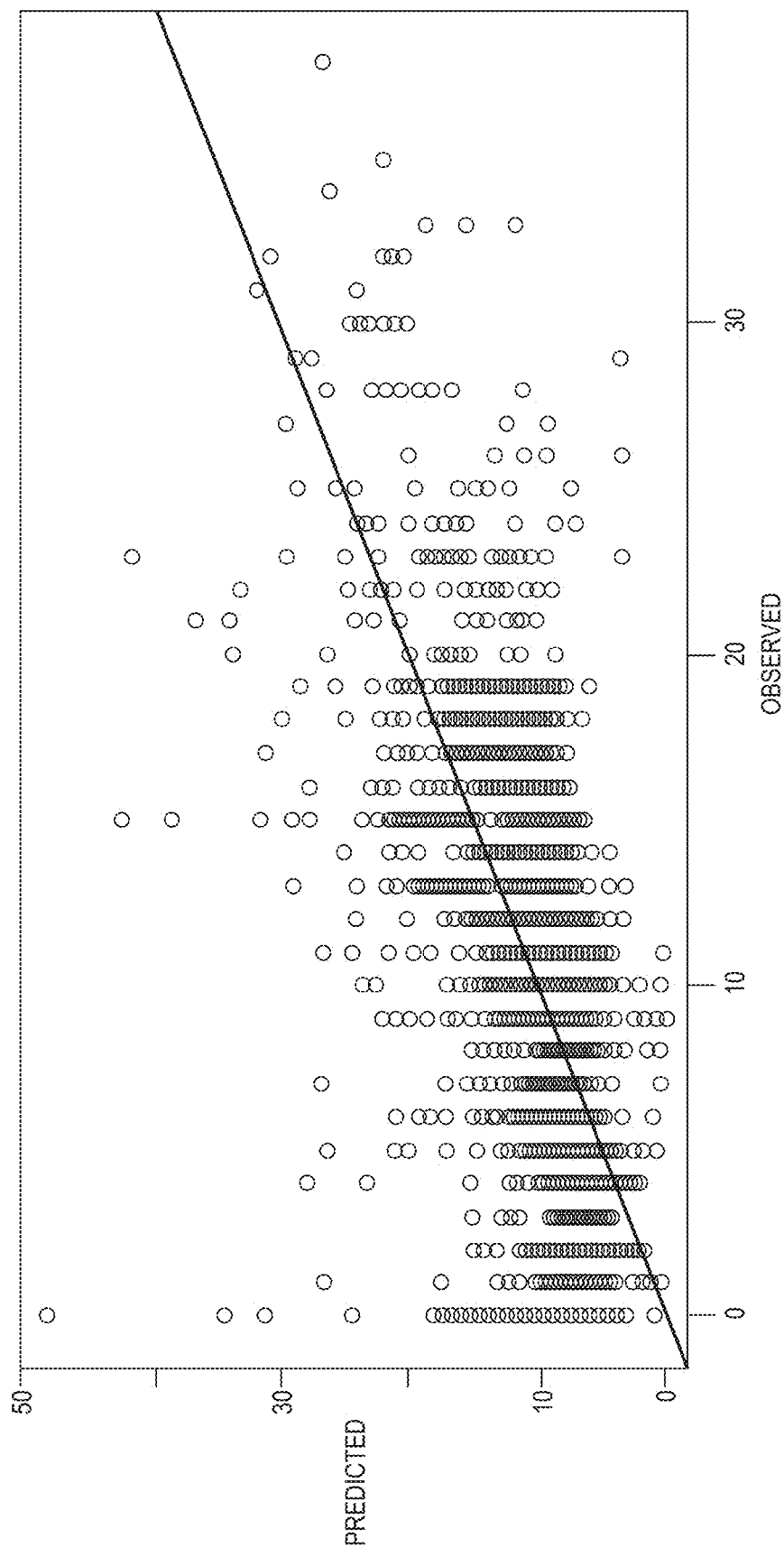
FIG. 2 depicts an example of a plot of observed and estimated passengers boarding for a particular transportation route according to an embodiment.
Figure 3A:
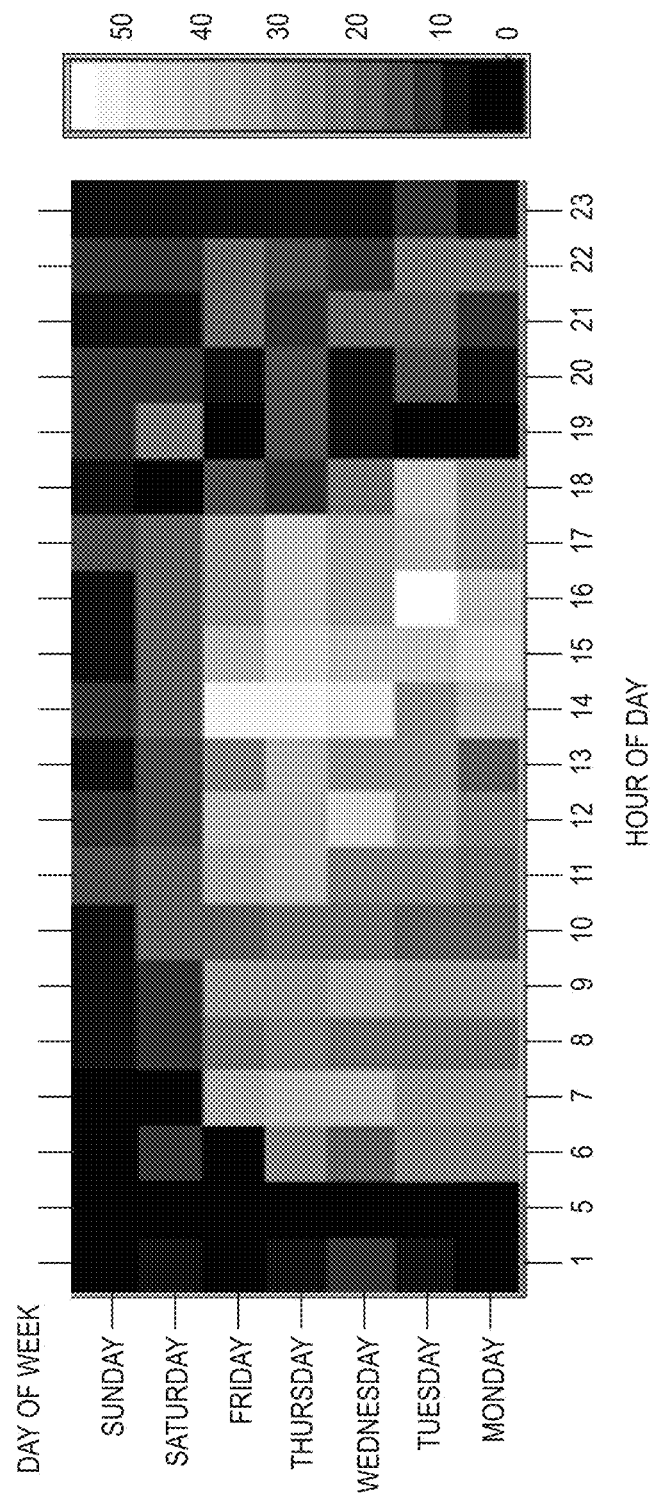
FIG. 3A depicts a level plot illustrating estimated demand at a stop on a transportation system as a function of hour and day of week according to an embodiment.
Figure 3B:
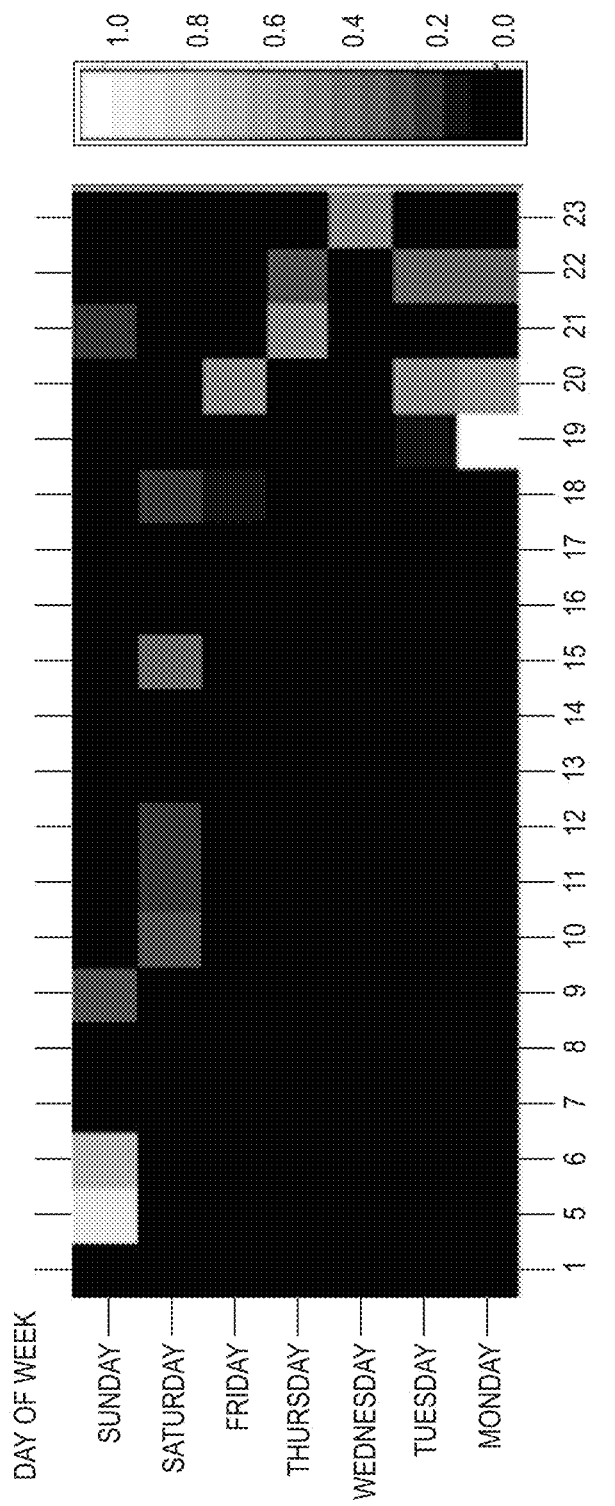
FIG. 3B depicts a level plot illustrating a probability of zero demand for a stop on a transportation system according to an embodiment.

FIGS. 2, 3A and 3B illustrate various components that may be included in an example report as described above. For example, as shown in FIG. 2, the report may include a plot of observed and estimated passengers boarding as modeled by the boarding count model. This information can be used to determine how accurate the boarding count model is with regard to a particular stop being analyzed.

As shown in FIG. 3A, the representation or indication of the instantaneous demand for a particular stop can be illustrated as a level plot having the hour of the day on the x-axis, and the day of the week on the y-axis. Such a plot as that shown in FIG. 3A can provide a quick visual indication of the instantaneous demand model, providing a scheduling manager or other related personnel a quick indication of demand at the stop.

For example, as shown in FIG. 3A, the instantaneous demand at Tuesday between 6:00 and 7:00 is about 30 people. Conversely, the instantaneous demand at Sunday between 20:00 and 21:00 is less than 10 people. Based upon this information, the scheduling manager or other related personnel can make informed decisions as to whether service to a stop should be increased or decreased at particular times.

Similarly, as shown in FIG. 3B, the representation or indication of the probability of no demand for a particular stop can be illustrated as a level plot with hour of the day on the x-axis, and the day of the week on the y-axis. Such a plot as that shown in FIG. 3B can provide a quick visual indication of the probability of there being no demand at a stop, providing a scheduling manager or other related personnel a quick indication of when demand for a stop is at its highest and, conversely, when demand for a stop is at its lowest.

For example, as shown in FIG. 3B, the instantaneous demand at Tuesday around 19:00 is about 0.7, indicating there is a high probability of there being no demand at the stop. Conversely, the instantaneous demand on Monday between 7:00 and 18:00 is less close to zero, indicating there is a very low probability of there being no demand during those times. Based upon this information, the scheduling manager or other related personnel can make informed decisions as to whether a stop can be eliminated at particular times without impacting or inconveniencing a large number of people.

It should be noted that, as described above, the transportation system may only operate a set number of hours a day. In the example illustrated in FIGS. 3A and 3B, the transportation system does not operate between 1:00 and 5:00 and, thus, those times are not illustrated in the plots.

The processes as described herein, including the model generations, calculations and derivations as described above, may be performed and implemented by one or more operators of one or more computing devices located at an operations center (e.g., a central operations center for a public transportation provider). Alternatively, the processes as described herein may be performed automatically by one or more computing devices.

Figure 4:
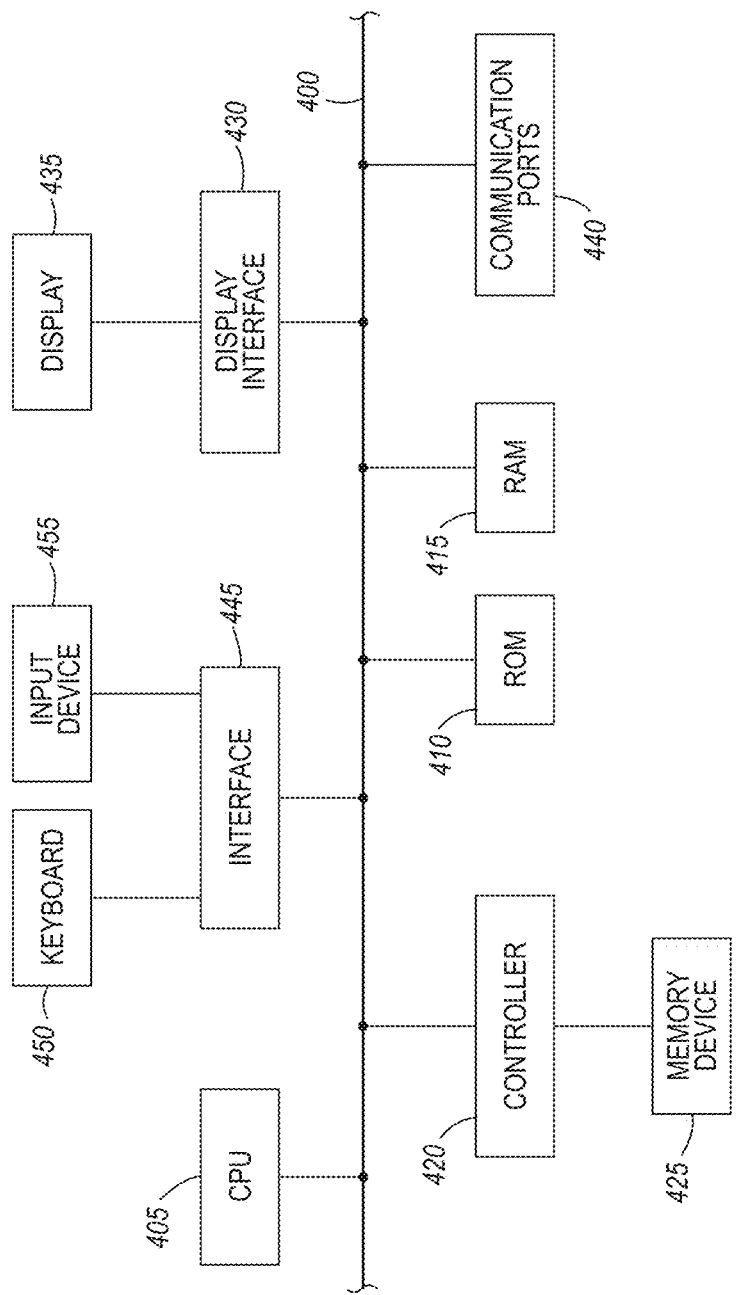
FIG. 4 depicts various embodiments of a computing device for implementing the various methods and processes described herein.

FIG. 4 depicts a block diagram of internal hardware that may be used to contain or implement the various computer processes and systems as discussed above. An electrical bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is a processing device, computing device or processor as such terms are used within this disclosure. Read only memory (ROM) 410 and random access memory (RAM) 415 constitute examples of memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 410 and/or the RAM 415. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium An optional display interface 430 may permit information from the bus 400 to be displayed on the display 435 in audio, visual, graphic or alphanumeric format. Communication with external devices may occur using various communication ports 440. A communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of identifying demand in a transportation system, the method comprising:
    by one or more automatic passenger counters associated with one or more vehicles in a transportation system, determining passenger arrival information for a plurality of passengers arriving at a plurality of stops on a route in the transportation system;
    determining, by a processing device, a boarding count model based upon the passenger arrival information;
    determining, by the processing device, a geographic and time-specific generalized boarding model based upon the boarding count model as well as information related to the plurality of stops on the route in the transportation system;
    for each of the plurality of stops:
        determining, by the processing device, an approximated uniform arrival model based upon the generalized boarding model and a time period between arriving vehicles at a specific stop,
        determining, by the processing device, an instantaneous demand model as a function of an expected rate of passenger arrival over time based upon the uniform arrival model by fitting the uniform arrival model using a Bayesian fitting method, wherein fitting the uniform arrival model comprises compensating for error associated with the passenger arrival information,
        determining, by the processing device, a probability of no demand model as an inverse function of the expected rate of passenger arrival over time based upon the uniform arrival model, determining an indication of instantaneous demand based upon the instantaneous demand model, and
determining an indication of probability of no demand based upon the probability of no demand model; and
based on the indication of instantaneous demand and the indication of probability of no demand, automatically altering at least one operational parameter of the transportation system by performing at least one of:
eliminating a stop on the route in the transportation system,
adding a stop to the route in the transportation system,
consolidating stops on the route in the transportation system,
adjusting fares collected during a specific time period,
adjusting vehicle type being dispatched during a specific time period, or
deploying an additional vehicle.

2. The method of claim 1, wherein determining the boarding count model comprises modeling passenger arrival using a zero inflated Poisson distribution.

3. The method of claim 2, wherein determining the generalized boarding model comprises generalizing the zero inflated Poisson distribution across each of the plurality of stops for the route in the transportation system.

4. The method of claim 1, wherein the Bayesian fitting method comprises a Markov Chain Monte Carlo method.

5. The method of claim 1, wherein the fitted model comprises a demand model varying over time for each of the plurality of stops.

6. A system for identifying demand in a transportation system, the system comprising:
a processing device;
automatic passenger counters associated with one or more vehicles in the transportation system, the automatic passenger counters are configured to determine passenger arrival information for a plurality of passengers arriving at a plurality of stops on a route in the transportation system; and
a computer readable medium in communication with the processing device, the computer readable medium comprising one or more programming instructions for causing the processing device to:
determine a boarding count model based upon the passenger arrival information,
determine a geographic and time-specific generalized boarding model based upon the boarding count model as well as information related to the plurality of stops on the route in the transportation system,
for each of the plurality of stops:
determine an approximated uniform arrival model based upon the generalized boarding model and a time period between arriving vehicles at a specific stop,
determine an instantaneous demand model as a function of an expected rate of passenger arrival over time based upon the uniform arrival model by fitting the uniform arrival model using a Bayesian method, wherein fitting the uniform arrival model comprises compensating for error associated with the passenger arrival information,
determine a probability of no demand model as an inverse function of the expected rate of passenger arrival over time based upon the uniform arrival model,
determine an indication of instantaneous demand based upon the instantaneous demand model, and
determine an indication of probability of no demand based upon the probability of no demand model; and
based on the indication of instantaneous demand and the indication of probability of no demand, automatically alter at least one operational parameter of the transportation system by performing at least one of:
eliminating a stop on the route in the transportation system,
adding a stop to the route in the transportation system,
consolidating stops on the route in the transportation system,
adjusting fares collected during a specific time period,
adjusting vehicle type being dispatched during a specific time period, or
deploying an additional vehicle.

7. The system of claim 6, wherein the one or more instructions for causing the processing device to determine the boarding count model comprise one or more instructions for causing the processing device to model passenger arrival using a zero inflated Poisson distribution.

8. The system of claim 7, wherein the one or more instructions for causing the processing device to determine the generalized boarding model comprise one or more instructions for causing the processing device to generalize the zero inflated Poisson distribution across each of the plurality of stops for the route in the transportation system.

9. The system of claim 6, wherein the Bayesian fitting method comprises a Markov Chain Monte Carlo method.

10. The system of claim 6, wherein the fitted model comprises a demand model varying over time for each of the plurality of stops.

11. The method of claim 1, wherein compensating for error associated with the passenger arrival information comprises modeling an instantaneous demand with a normal distribution having a mean and precision, wherein:
the mean is based on at least whether a passenger is actually waiting at the stop at any giving time; and
the precision is based on a measurement of random variations in the passenger arrival information.

12. The system of claim 6, the one or more instructions for causing the processing device to compensate for error associated with the passenger arrival information comprise one or more instructions for causing the processing device model an instantaneous demand with a normal distribution having a mean and precision, wherein:
the mean is based on at least whether a passenger is actually waiting at the stop at any giving time; and
the precision is based on a measurement of random variations in the passenger arrival information.

* * * * *